United States Patent [19]

Evjen

[11] 4,409,536
[45] Oct. 11, 1983

[54] SUPPORT MEANS FOR PLUG-IN TRANSFORMER/CHARGER

[75] Inventor: John M. Evjen, Gainesville, Fla.

[73] Assignee: General Electric Company, Gainesville, Fla.

[21] Appl. No.: 302,320

[22] Filed: Sep. 14, 1981

Related U.S. Application Data

[63] Continuation of Ser. No. 66,190, Aug. 13, 1979, abandoned.

[51] Int. Cl.³ .............................................. H02J 7/00
[52] U.S. Cl. ....................................... 320/2; 320/57; 174/54
[58] Field of Search ................... 307/150; 320/2, 3, 4, 320/57, 59; 174/54

[56] References Cited

U.S. PATENT DOCUMENTS 3,499,102 3/1970 Gillemot ........................ 174/138 F
4,109,193 8/1978 Schultheis .............................. 320/2

FOREIGN PATENT DOCUMENTS 1492349 8/1967 France ............................... 174/70 C
2072969 10/1981 United Kingdom ................... 320/2

Primary Examiner—William M. Shoop
Assistant Examiner—Anita M. Ault
Attorney, Agent, or Firm—Henry J. Policinski

[57] ABSTRACT

A direct plug-in electrical device, such as a charging system including a transformer in a housing, is provided with fastening means adapted to engage anchoring means on a conventional outlet, thereby enhancing the load-carrying capability of the outlet.

10 Claims, 4 Drawing Figures

SUPPORT MEANS FOR PLUG-IN TRANSFORMER/CHARGER

The present application is a continuation of application Ser. No. 66,190 filed Aug. 13, 1979 now abandoned.

This invention relates to an improved direct plug-in electrical device having integral means for supporting the device from a conventional outlet. More particularly, it relates to a new and improved support system for a transformer/charging device whereby rechargeable batteries are connectable to the non-electrical components of a charge current source of the type described in U.S. Pat. No. 4,009,429 and in commonly assigned copending application Ser. No. 877,299, filed Feb. 13, 1978, both of which are incorporated herein by reference.

BACKGROUND OF THE INVENTION

There is an increasing number of consumer products being operated by rechargeable cells such as nickel cadmium cells. These products require cells with a plurality of physical sizes and electrical characteristics. The above-mentioned patent, U.S. Pat. No. 4,009,429 and application, Ser. No. 877,299, describe charging systems for AA, C, D and 9 volt size batteries which employ battery carrying modules adapted to close couple with a charge current source or with such a source and an adapter. In any case, the charge current source is provided with the familiar two blade electrical contacts for insertion into the sockets of a standard duplex wall outlet, which serves as a source of 110-120V AC current.

The total suspended weight of a direct plug-in electrical device, such as a battery charger or a specialty transformer as used with toys, is limited by the ability of the blades of the electrical device to directly support the weight of the device through their frictional engagement with the socket receptacle of the outlet. In fact, Underwriters Laboratories' standards limit this weight generated torque to 9 inch ounces. In those instances where the torque generated by the weight of the plug-in electrical device is in excess of 9 inch ounces, additional support means must be provided. It is recognized in the Underwriters Laboratories standards that the center screw which attaches the cover plate to the outlet may be used to support additional weight, on the order of an additional twenty ounces. However, the disadvantage in the use of the cover plate attachment screw is the inconvenience in removing and replacing the screw each time the electrical device such as a transformer/charger is used. Generally, such devices are plugged in and removed in repeated cycles, and thus the inconvenience associated with removing and replacing the cover plate screw, as well as the cover plate, is readily apparent.

SUMMARY

The present invention pertains to providing an electrical device with an integral auxiliary support means that detachably mates with a fastener means attached to the wall plate, the wall plate screw, or to the outlet box itself. The auxiliary support means permits even a relatively heavy electrical device to be plugged into the outlet source with simultaneous mechanical support being achieved. Detaching and unplugging can be simultaneously accomplished at will. The auxiliary support means may take the form of a "Velcro" fastener, one part of which is affixed to the electrical device, while the other part thereof is affixed to the cover plate; said —Velcro" portions being mounted for engagement when the electrical device is plugged into the outlet receptacle. In alternate embodiments, the cover plate screw may be replaced with a specially designed anchoring post which cooperates with a recessed portion formed in the housing of the electrical device, while in a still further embodiment, a snap fastener may be provided, the respective portions of which are secured to the cover plate and the electrical device for simultaneously providing auxiliary support to the electrical device when it is plugged into the electrical outlet.

BRIEF DESCRIPTION OF THE DRAWINGS

The invention may be more readily understood by reference to the appended drawings in which.

DETAILED DESCRIPTION OF THE INVENTION

Figure 1:
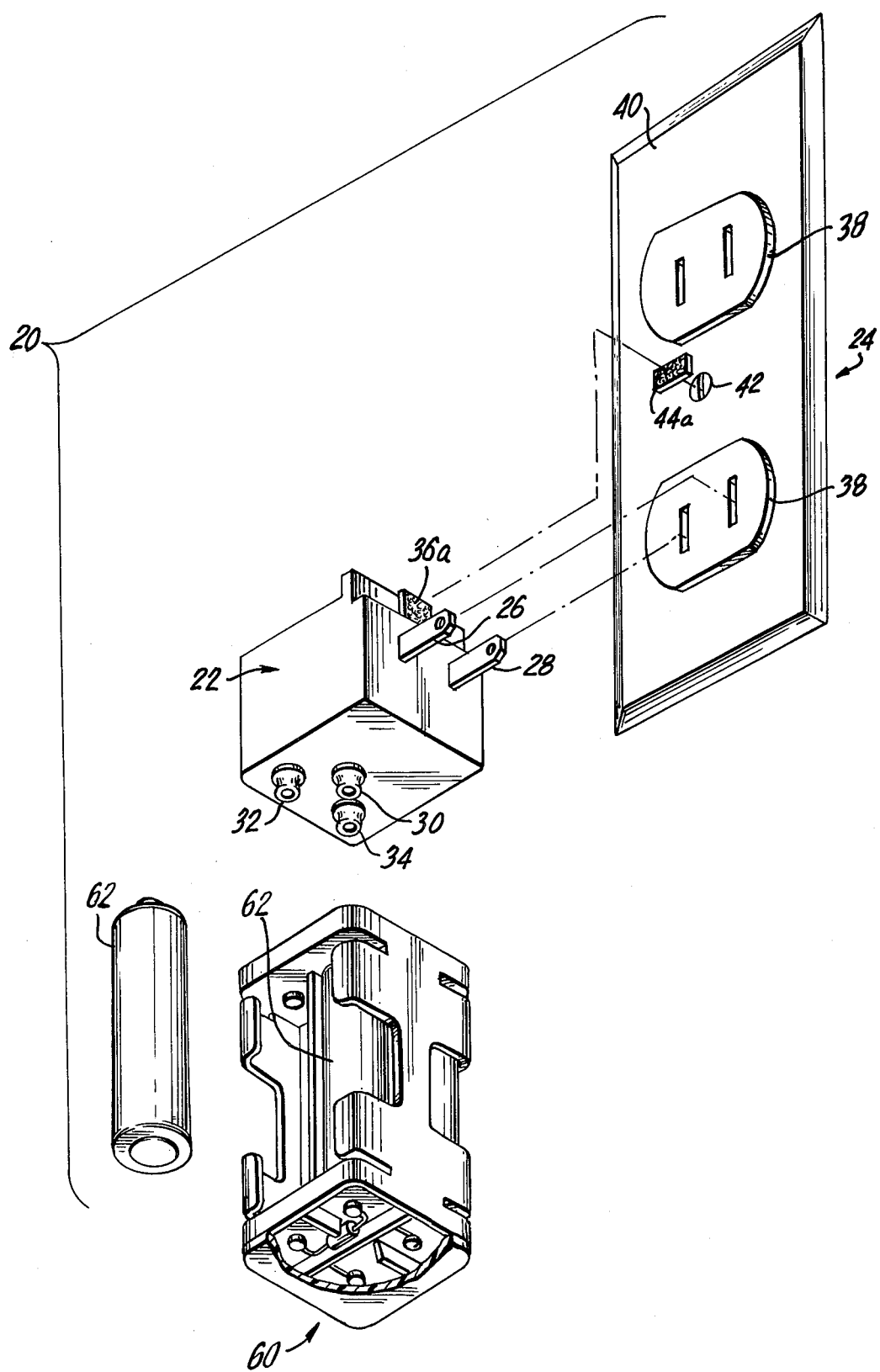
FIG. 1 is an exploded perspective view of a first embodiment of an electrical device made according to the subject invention, a battery carrying module, a typical battery, and an outlet and cover plate source for 120V AC.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated. Furthermore, while the several preferred embodiments of the invention will be described with reference to a battery charger, it is readily apparent that the invention has application for use in connection with any type of electrical device adapted to be plugged into an outlet, and wherein simultaneous auxiliary support for the electrical device is desired.

Figure 2:
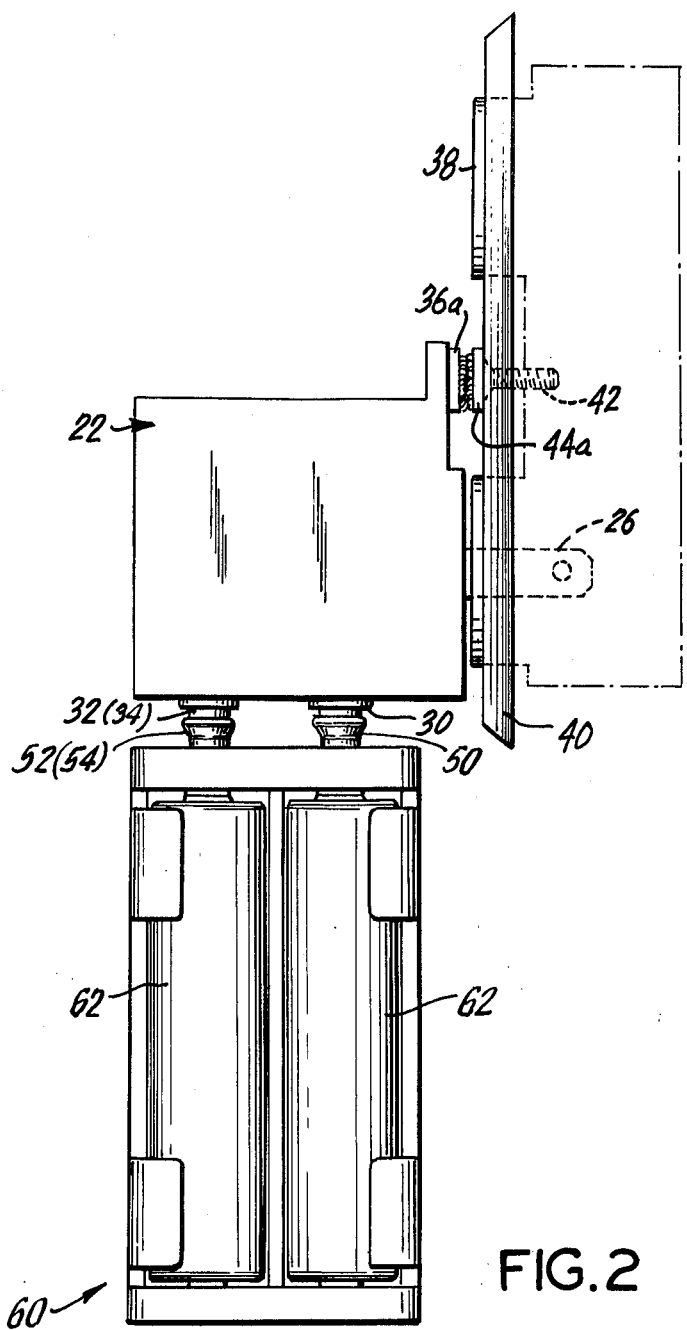
FIG. 2 is a side elevational view, partially in section, of the electrical device of FIG. 1, with the various components thereof being in assembled condition and with the electrical device being plugged into the outlet.

The overall system 20 of which the present modified sources form elements is shown in FIG. 1. System 20 includes a charge current source 22 and a conventional outlet source 24 of 120V AC. A battery carrying module 60 is releasably connected to the charge current source and is adapted to accommodate a plurality of batteries 62, 62. To aid in understanding the invention, FIG. 1 shows in exploded form charge current source 22, module 60 and batteries 62 as generally located when assembled for charging. FIG. 2 shows an assembled unit with two batteries in place for charging. While the charger is shown hanging down from the lower socket, obviously, it can be arranged to stand upwardly, and the top socket can be used.

THE CHARGE SOURCE

The charge current source 22 is comprised of a conventional high impedance center tap transformer. Two blades 26 and 28 are provided in one face of the charger housing for connection to a socket receptable 38 of the source 24 of 120V AC. Source 22 is available commercially from the assignee, General Electric Company, under the designation BC-3 miniature charger, and is described in the above-identified U.S. Pat. No. 4,009,429. Charge current source 22 comprises a transformer to make available from the standard 110-120 volt, 60 cycle AC line an output current of appropriate magnitude for the load provided. A terminal 30 of the charge current source 22 is centrally tapped to the secondary transformer, while terminals 32 and 34 are end tapped to the secondary of the transformer. Terminals 30, 32, and 34 are one-way, snap-type "male" terminals attached to a surface of the charge current source 22. The terminals 30, 32 and 34 are adapted to be connected to the snap-type "female" terminals 50, 52 and 54 (see FIG. 2), provided on the top surface of the battery carrying module 60 which is adapted to accommodate the plurality of batteries, designated by the numerals 62, 62.

Figure 3:
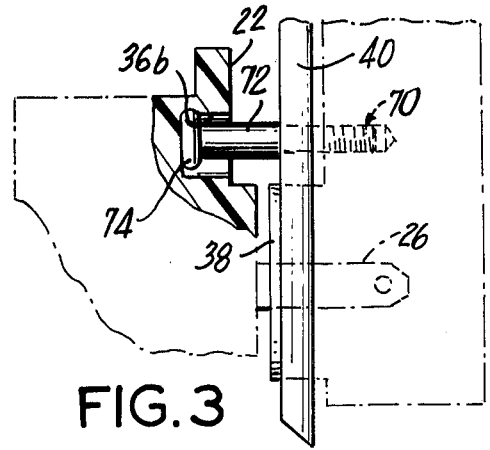
FIG. 3 is an elevational view, partially in section, of an electrical device according to a second embodiment of the subject invention.

Fastening means are provided on the charge current source 22 for purposes of providing auxiliary support for the source 22 when it is engaged with the receptacle 38 of outlet 24. The fastener means may take the form of a locking pin arrangement, snap fastener device, a pair of mating hooks, a "Velcro" connector, or the like. In the embodiment of FIGS. 1 and 2, the fastening means comprises a patch of "Velcro" designated by the numeral 36a, which is in the form of a plurality of substantially rigid outwardly facing tiny plastic, e.g., nylon hooks. "Velcro" is available commercially. In the embodiment of FIG. 3, the fastening means for the charge current source comprises a socket recess 36b, while the embodiment of FIG. 4, the fastening means comprises the female portion 36c of a snap fastener.

THE OUTLET SOURCE OF 120V AC

Source 24 comprises a conventional dual outlet receptacle 38, a cover plate 40, and a screw 42 for mounting the cover plate to the outlet receptacle 38.

In the embodiment of FIGS. 1 and 2, a small patch of "Velcro" 44a in the form of a plurality of substantially rigid, outwardly facing tiny plastic loops is bonded or otherwise secured to the cover plate 40 in the vicinity of the cover plate screw 42. The "Velcro" patch 44a is positioned so as to be in alignment and juxtaposed to the "Velcro" patch 36a secured to the charge current source 22 when the latter is plugged into outlet 24. At such time, the plastic hooks of the "Velcro" patch 36a mate with and interlock with the loops of the "Velcro" patch 44a secured to the cover plate. Alternatively, the hooks and loops of the "Velcro" patches 36a and 44a can be reversed, and the location of the respective patches may be modified, as long as they are in alignment and in abutting relationship when the charge current source 22 is plugged into the receptacle 38. The "Velcro" patches 36a and 44a may be respectively secured to the charge current source 22 and the cover plate 40 by other forms of mechanical means, instead of with adhesive.

In operation, as the charge current source 22 is fully inserted into the socket portions of receptacle 38, the hooks and loops of the "Velcro" patches 36a, 44a interlock so as to simultaneously provide support for the suspended charge current source 22 and battery holder 60, in addition to the frictional support provided by the interengagement of blades 26, 28 and the socket receptacle 38. Accordingly, greater support is provided for the charge current source 22, and the attachments thereto, than would otherwise be provided by the mere frictional engagement of the blades 26, 28 and the socket receptacle 38.

In the embodiment of FIG. 3, the cover plate attachment screw is replaced with an anchoring pin post 70 including a shank 72 which extends beyond the front surface of the cover plate 40 and terminates with an enlarged shoulder portion 74. The face of the charge current source 22 from which the blades 26, 28 extend includes the recess 36b terminating in an enlarged detent portion which cooperates with the shoulder 74 of post 70 for providing additional support to the assembly of the charge current source 22 and the depending battery carrier 60. The shank portion 72 of the anchoring pin may be of sufficient diameter for bearing against the front face of the cover plate 40 for maintaining same in fixed position.

Figure 4:
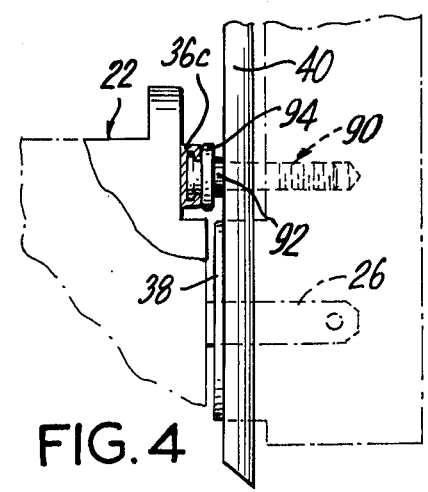
FIG. 4 is an elevational view, partially in section, of a third embodiment of an electrical device according to the subject invention.

In the embodiment of FIG. 4, the cover plate locking screw is replaced by an anchor screw 90 having a shank 92 which extends beyond the face of the cover plate 40 and terminates with a male snap fastener portion 94. The latter is adapted to cooperate with the female portion 36c on the charge current source 22 for providing auxiliary support for the source 22 and the depending battery carrier 60. Shank 92 may be of sufficient diameter to include a shoulder portion for maintaining the cover plate 40 in place. The male and female snap portions 36c, 94, may be reversed, and if desired, the female snap portion 36c may be molded directly in the plastic housing of the charge current source 22.

Obviously, many variations will suggest themselves to those skilled in the art in light of the above, detailed description without departing from the scope and spirit of the appended claims.

I claim:

1. A charging system adapted for use with a conventional outlet source, said system comprising:
   (i) a charge current source including a high impedence center tapped transformer, a housing for said transformer, two blades extending from one face of the housing for engagement with the socket outlet source, and fastening means on said face of the housing; and
   (ii) anchoring means disposed on said outlet and detachable matable with said fastening means, whereby engagement of said fastening means with said anchoring means when the charge current source is plugged into the outlet source provides auxiliary mechanical supporting for the charge current source and any associated modules, said mechanical support occurring simultaneously with the plugging in of the charge current source into the outlet source.

2. The charging system of claim 1 wherein said fastening means on the face of the housing is a female aperture with an inner recessed detent, and the anchoring means on the outlet comprises a pin adapted to enter the aperture and interlock therewith.

3. The charging system of claim 1, wherein said fastening means on the face of the housing is a first portion of a snap fastener and the anchoring means on the outlet comprises a second portion of a snap fastener.

4. The charging system of claim 1, wherein said fastening means on the face of the housing is a patch of substantially rigid plastic loops and the anchoring means on the outlet comprises a patch of substantially rigid plastic hooks or vice versa.

5. A support system for an electrical device including blades adapted to be plugged into the socket of a conventional outlet source, said system comprising:
 (i) fastening means disposed on the surface of the electrical device adjacent said blades; and
 (ii) anchoring means disposed on said outlet and detachably matable with said fastening means whereby engagement of said fastening means with said anchoring means when the electrical device is plugged into the outlet source provides auxiliary mechanical support for the electrical device, said mechanical support occurring simultaneously with the plugging in of the charge current source into the outlet source.

6. The support system of claim 5, wherein said fastening means on the electrical device is a female aperature with an inner recessed detent, and the anchoring means on the outlet comprises a pin adapted to enter the aperture and interlock therewith.

7. The support system of claim 5, wherein said fastening means on the electrical device is a first portion of a snap fastener, and the anchoring means on the outlet comprises a second portion of a snap fastener.

8. The support system of claim 5, wherein said fastening means on the electrical device is a patch of substantially rigid plastic loops, and the anchoring means on the outlet comprises a patch of substantially rigid plastic hoods, or vice versa.

9. The system of claims 2 or 6, wherein said outlet includes a conventional cover plate and said anchoring means includes an anchoring pin post having a shank portion extended beyond the face of said cover plate and terminating in an enlarged shoulder portion for engaging the inner recessed detent, and with said shank portion being of sufficient size for maintaining the cover plate in place.

10. The system of claims 3 or 7, wherein said outlet includes a conventional cover plate and said anchoring means includes an anchor screw having a shank which extends beyond the face of the cover plate and terminates in the second portion of a snap fastener, with the shank portion maintaining said cover plate in fixed position.

* * * * *